United States Patent

Fett et al.

[11] Patent Number: 6,065,813
[45] Date of Patent: May 23, 2000

[54] TWO-PIECE FRICTION WELDED MOTOR VEHICLE AXLE SHAFT

[75] Inventors: Gregory A. Fett; Jeffrey L. Colbert, both of Fort Wayne, Ind.

[73] Assignee: Dana Corporation, Toledo, Ohio

[21] Appl. No.: 09/138,760

[22] Filed: Aug. 24, 1998

[51] Int. Cl.[7] ................................................. B60B 35/18
[52] U.S. Cl. ................................. 301/124.1; 228/114.5
[58] Field of Search ............................. 301/124.1, 130, 301/137; 228/112.1, 114.5; 180/378, 379; 29/894.012

[56] References Cited

U.S. PATENT DOCUMENTS

| | | | |
|---|---|---|---|
| 1,913,464 | 3/1933 | Urschel . | |
| 1,964,258 | 6/1934 | Graham | 29/153.1 |
| 2,019,811 | 11/1935 | Graham | 301/124 |
| 3,238,612 | 3/1966 | Herman | 228/2 |
| 3,777,360 | 12/1973 | Welch | 228/114.5 |
| 4,087,038 | 5/1978 | Yagi | 228/114.5 |
| 4,135,766 | 1/1979 | Trauloff | 301/114 |
| 4,768,839 | 9/1988 | Spindler | 301/124 R |
| 5,064,112 | 11/1991 | Isobe et al. | 228/112.1 |
| 5,314,106 | 5/1994 | Ambroziak et al. | 228/114.5 |

FOREIGN PATENT DOCUMENTS

| | | | |
|---|---|---|---|
| 55-1243 | 1/1980 | Japan | 301/137 |
| 2066176 | 7/1981 | United Kingdom | 301/137 |
| 2124166 | 2/1984 | United Kingdom | 301/137 |

*Primary Examiner*—Russell D. Stormer
*Attorney, Agent, or Firm*—Oldham & Oldham Co., L.P.A.

[57] ABSTRACT

Two-piece friction welded motor vehicle axle shaft which includes an axle portion which is frictionally welded to a flange portion. The flange portion is preferably fabricated from a relatively high carbon steel material, such as SAE 1050 Mod (Mn 0.80–1.10%), to satisfy the hardness requirement for the bearing race and the axle portion is preferably fabricated from a steel barstock material, such as SAE 1038, SAE 1040 or SAE 8630, having a somewhat lower carbon content to maximize its strength and ductility. The friction weld is preferably positioned inboard of the bearing race and, once welded, the two-piece motor vehicle axle shaft is machined to part profile, heat treated and then machined to final print dimensions.

20 Claims, 1 Drawing Sheet

TWO-PIECE FRICTION WELDED MOTOR VEHICLE AXLE SHAFT

BACKGROUND AND SUMMARY OF THE INVENTION

The present invention relates generally to a new and novel two-piece friction welded motor vehicle axle shaft. More particularly, the present invention relates to a new and novel two-piece friction welded motor vehicle axle shaft which includes an axle portion which is frictionally welded to a flange portion.

Motor vehicle axle shafts are exposed to significant levels of stress, including force and vibration, during operation of the motor vehicle. Torsional overload type failures of motor vehicle axle shafts sometimes occur due to abusive operating conditions. Such failures can cause separation of the wheel and/or the motor vehicle axle shaft from the motor vehicle.

Typical known prior art motor vehicle axle shafts have been fabricated from a single piece of material, typically steel, having a substantially uniform chemical composition throughout the motor vehicle axle shaft. Although the properties in certain portions of the motor vehicle axle shaft can be modified by such material treatment operations as heat treatment or more localized material treatment operations, such as induction hardening, stress relieving, tempering and/or shot peening, the properties which can be obtained are limited by the chemical composition of the material used. This is undesirable because certain portions of the motor vehicle axle shaft are exposed to high contact stresses and thus need additional hardness while other portions of the motor vehicle axle shaft need less hardness but additional ductility. Such a balance of properties is difficult to obtain when using a material having a substantially uniform composition. In addition, specialized material treatment operations can be expensive and time consuming.

Typically, prior art friction welded axle shafts have been used in applications which carry essentially no beaming loads. However, it would be desirable to utilize a two-piece friction welded motor vehicle axle shaft in applications which carry vehicle beaming loads.

A preferred embodiment of the present invention is, therefore, directed to a two-piece friction welded motor vehicle axle shaft which includes an axle portion which is frictionally welded to a flange portion. The flange portion is preferably fabricated from a relatively high carbon steel material, such as SAE 1050 Mod (Mn 0.80–1.10%), to satisfy the hardness requirement for the bearing race and the axle portion is preferably fabricated from a steel barstock material, such as SAE 1038, SAE 1040 or SAE 8630, having a somewhat lower carbon content to maximize its strength and ductility. The friction weld is positioned inboard of the bearing race and, once welded, the two-piece motor vehicle axle shaft is machined to part profile, heat treated and then machined to final print dimensions.

Other advantages and novel features of the present invention will become apparent in the following detailed description of the invention when considered in conjunction with the accompanying drawings.

DETAILED DESCRIPTION OF THE DRAWINGS

Figure 1:
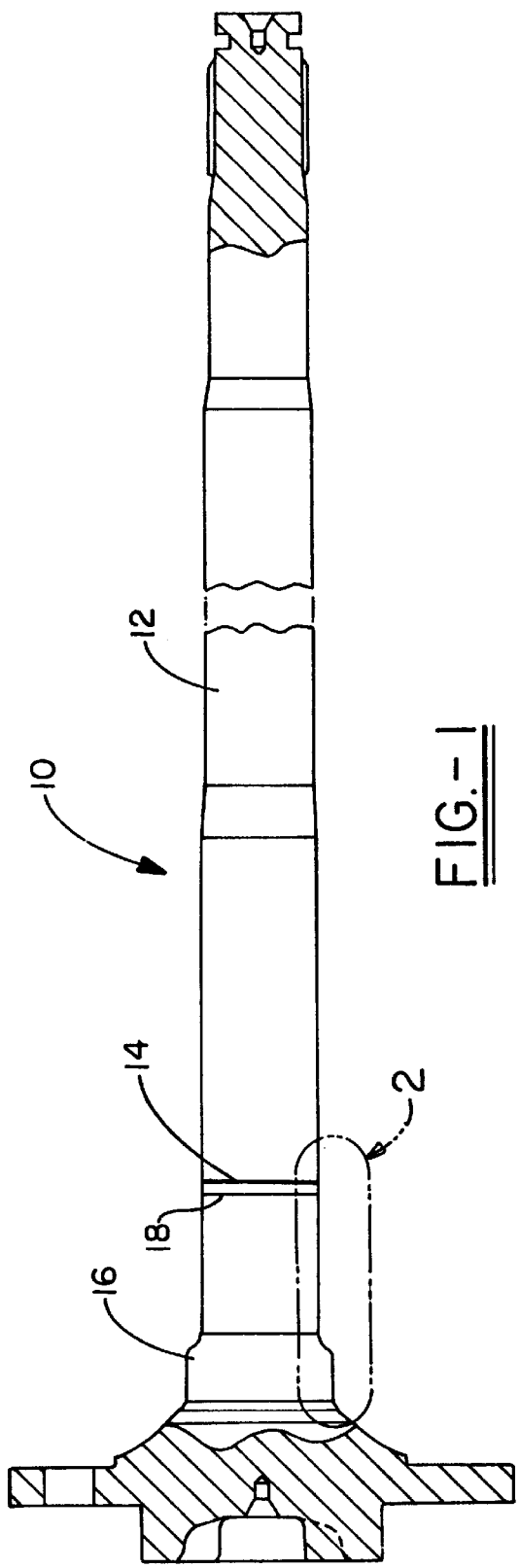
FIG. 1 is a side elevational view, partially in cross-section and partially in plan view, of a two-piece friction welded motor vehicle axle shaft in accordance with a preferred embodiment of the present invention.
Figure 2:
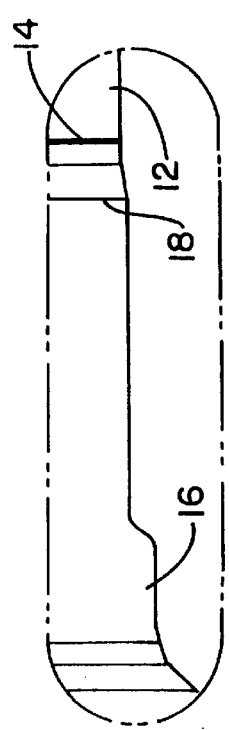
FIG. 2 is a side elevational view of the two-piece friction welded motor vehicle axle shaft in accordance with the preferred embodiment of the present invention shown in the encircled portion indicated by 2 in FIG. 1.
Figure 3:
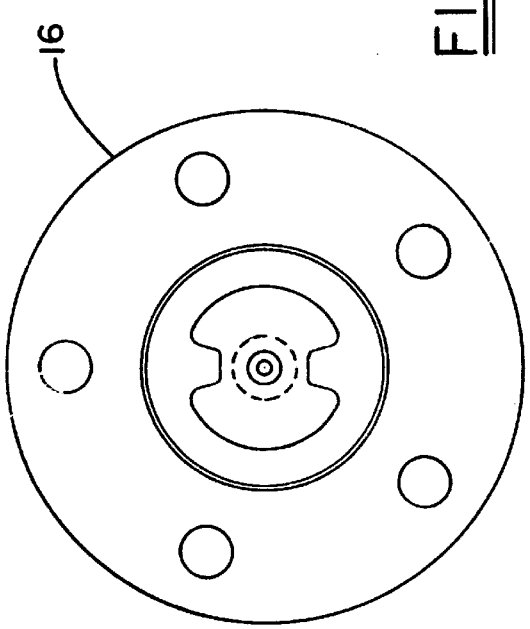
FIG. 3 is an outboard end elevational view of the two-piece friction welded motor vehicle axle shaft in accordance with the preferred embodiment of the present invention shown in FIG. 1.

In the following detailed description of a preferred embodiment of the present invention, reference is made to the accompanying drawings which, in conjunction with this detailed description, illustrate and describe a preferred embodiment of a two-piece friction welded motor vehicle axle shaft, generally identified by reference number 10, in accordance with the present invention. Referring now to the drawings, in which like-identified characters represent corresponding elements throughout the several views, attention is directed to FIGS. 1 through 3, which illustrate a side elevational view, partially in cross-section and partially in plan view, a side elevational view taken from section 2—2 in FIG. 1 and an outboard end elevational view, respectively, of two-piece friction welded motor vehicle axle shaft 10 in accordance with a preferred embodiment of the present invention. Two-piece friction welded motor vehicle axle shaft 10 generally includes axle portion 12 which is frictionally welded at weld joint 14 to flange portion 16. Flange portion 16 is preferably fabricated from a relatively high carbon steel material, such as SAE 1050 Mod (Mn 0.80–1.10%), to satisfy the hardness requirement for the bearing race and axle portion 12 is preferably fabricated from a steel barstock material, such as SAE 1038, SAE 1040 or SAE 8630, having a somewhat lower carbon content to maximize its strength and ductility. Weld joint 14 is preferably positioned inboard of inboard end of bearing race 18 and, once welded, two-piece friction welded motor vehicle axle shaft 10 is machined to part profile, heat treated and then machined to final print dimensions.

Torsional overload type failures of motor vehicle axle shafts sometimes occur due to abusive operating conditions. Such failures can cause separation of the wheel and/or the motor vehicle axle shaft from the motor vehicle. Two-piece friction welded motor vehicle axle shaft 10 in accordance with the present invention can be utilized as a two-piece friction welded semi-float motor vehicle rear axle shaft—on bearing design and combines the ductility and overload characteristics of a relatively low carbon steel material with the high hardness characteristics of a relatively medium or high carbon steel material for the on-shaft bearing race. Such a design takes advantages of different inherent material characteristics.

Typically, friction welded motor vehicle shafts have been used in applications which carry essentially no beaming loads. However, two-piece friction welded motor vehicle axle shaft 10 in accordance with the present invention is a two-piece friction welded semi-float motor vehicle rear axle shaft—on bearing design and therefore carries vehicle beaming loads.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A two-piece friction welded motor vehicle axle shaft, comprising:

a flange portion having an inboard end, said flange portion being fabricated from a steel material having a relatively high carbon content; and an axle portion having an outboard end, said axle portion being fabricated from a steel material having a relatively low carbon content and said inboard end of said flange portion is welded to said outboard end of said axle portion by a friction welding process to form the two-piece friction welded motor vehicle axle shaft.

2. The two-piece friction welded motor vehicle axle shaft in accordance with claim 1, wherein said axle portion is fabricated from a steel barstock material.

3. The two-piece friction welded motor vehicle axle shaft in accordance with claim 2, wherein said steel barstock material is SAE 1038.

4. The two-piece friction welded motor vehicle axle shaft in accordance with claim 2, wherein said steel barstock material is SAE 1040.

5. The two-piece friction welded motor vehicle axle shaft in accordance with claim 2, wherein said steel barstock materials is SAE 8630.

6. The two-piece friction welded motor vehicle axle shaft in accordance with claim 2, wherein said flange portion is fabricated from SAE 1050 Mod (Mn 0.80–1.10%).

7. The two-piece friction welded motor vehicle axle shaft in accordance with claim 2, wherein the friction weld is positioned inboard of the bearing race.

8. The two-piece friction welded motor vehicle axle shaft in accordance with claim 7, wherein the two-piece friction welded motor vehicle axle shaft is machined to part profile, heat treated and then machined to final print dimensions following the friction welding process.

9. The two-piece friction welded motor vehicle axle shaft in accordance with claim 1, wherein the friction weld is positioned inboard of the bearing race.

10. The two-piece friction welded motor vehicle axle shaft in accordance with claim 9, wherein the two-piece friction welded motor vehicle axle shaft is machined to part profile, heat treated and then machined to final print dimensions following the friction welding process.

11. The two-piece friction welded motor vehicle axle shaft in accordance with claim 1, wherein the two-piece friction welded motor vehicle axle shaft is machined to part profile, heat treated and then machined to final print dimensions following the friction welding process.

12. The two-piece friction welded motor vehicle axle shaft in accordance with claim 1, wherein said axle portion is fabricated from SAE 1038 material.

13. The two-piece friction welded motor vehicle axle shaft in accordance with claim 12, wherein the friction weld is positioned inboard of the bearing race.

14. The two-piece friction welded motor vehicle axle shaft in accordance with claim 1, wherein said axle portion is fabricated from SAE 1040 material.

15. The two-piece friction welded motor vehicle axle shaft in accordance with claim 14, wherein the friction weld is positioned inboard of the bearing race.

16. The two-piece friction welded motor vehicle axle shaft in accordance with claim 15, wherein the two-piece friction welded axle shaft is machined to part profile, heat treated and then machined to final print dimensions following the friction welding process.

17. The two-piece friction welded motor vehicle axle shaft in accordance with claim 1, wherein said axle portion is fabricated from SAE 8630 material.

18. The two-piece friction welded motor vehicle axle shaft in accordance with claim 17, wherein the friction weld is positioned inboard of the bearing race.

19. The two piece friction welded motor vehicle axle shaft in accordance with claim 1, wherein said flange portion is fabricated from SAE 1050 Mod (Mn 0.80–1.10%).

20. The two-piece friction welded motor vehicle axle shaft in accordance with claim 19, wherein the friction weld is positioned inboard of the bearing race.

* * * * *